No. 865,306. PATENTED SEPT. 3, 1907.
F. M., J. S. & W. W. HILTON.
MEANS FOR SECURING SOFT TREAD TIRES TO RIMS.
APPLICATION FILED MAY 12, 1906.
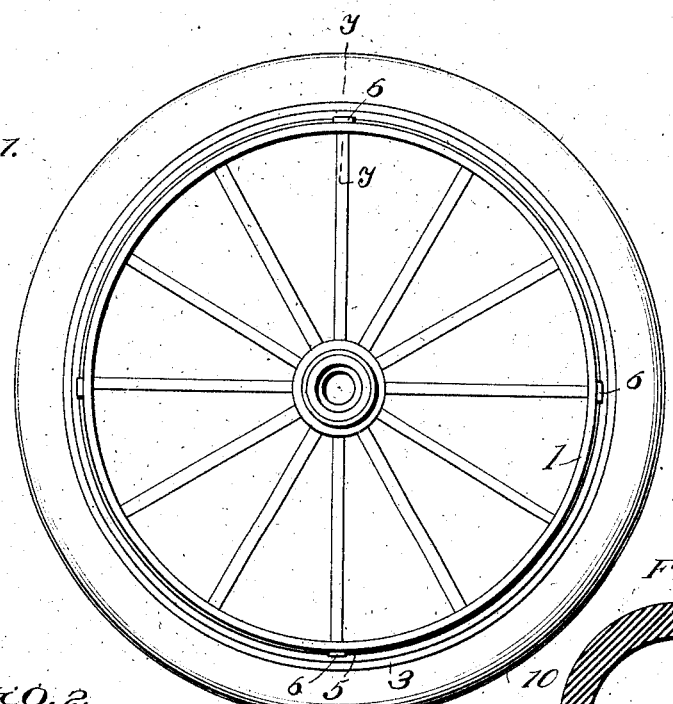
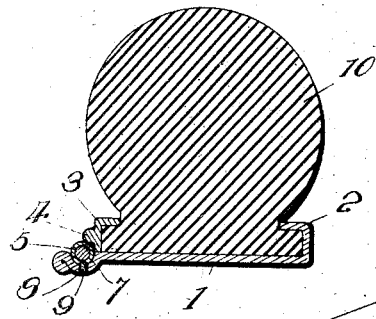
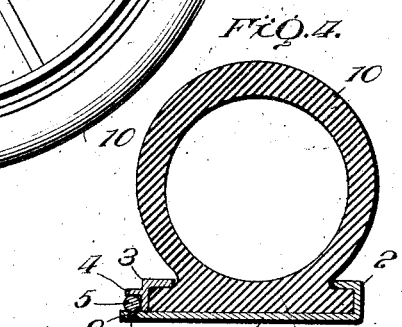
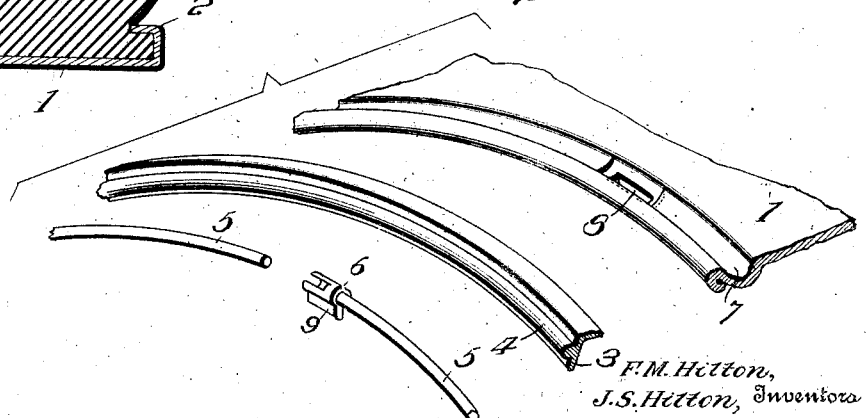
F. M. Hilton,
J. S. Hilton, Inventors
W. W. Hilton,

UNITED STATES PATENT OFFICE.

FRANK M. HILTON, JOHN S. HILTON, AND WILLIAM W. HILTON, OF AKRON, OHIO, ASSIGNORS OF ONE-HALF TO HARVEY MUSSER, OF AKRON, OHIO.

MEANS FOR SECURING SOFT-TREAD TIRES TO RIMS.

No. 865,306.　　　　　Specification of Letters Patent.　　　　　Patented Sept. 3, 1907.

Application filed May 12, 1906. Serial No. 316,563.

*To all whom it may concern:*

Be it known that we, FRANK M. HILTON, JOHN S. HILTON, and WILLIAM W. HILTON, citizens of the United States, residing at Akron, in the county of Summit and State of Ohio, have invented certain new and useful Improvements in Means for Securing Soft-Tread Tires to Rims, of which the following is a specification.

The purpose of the present invention is to improve the general structure of the rim of vehicle wheels of the type supplied with yieldable tires, whether solid cushion or pneumatic, whereby the tire may be conveniently and expeditiously placed in position or removed, as occasion may require.

The invention relates chiefly to the securing means, whereby the tire is fastened to the rim after being fitted thereto, said securing means being of such structure as to admit of releasing the tire when it is required to remove the same either to replace it by a new one or to admit of making repairs or for any other required purpose.

The invention embodies a rim having a confining flange at one side, a removable lock-ring fitted to the opposite side of said rim and having a companion confining flange, and securing means for the lock-ring consisting of a split annular binder having projections at intervals in its circumferential length to enter openings or seats near the outer edge of the rim at the side opposite to that provided with the confining flange.

For a full description of the invention and the merits thereof and also to acquire a knowledge of the details of construction of the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a side view of a vehicle wheel embodying the invention. Fig. 2 is a cross section of the wheel on the line y—y of Fig. 1, showing the parts on a larger scale. Fig. 3 is a detail perspective view of a portion of the rim, lock-ring and the binder, the parts being separate and arranged in a group. Fig. 4 is a detail view of a modification.

Corresponding and like parts are referred to in the following description and indicated in all the views of the drawings by the same reference characters.

The vehicle wheel may be of any type provided with a yieldable tire and specially designed for mechanically propelled vehicles of the automobile type.

The rim 1 of the wheel is provided at one side with a confining flange 2 which may have any form depending upon the particular design or make of tire. The lock-ring 3 is removably fitted to the opposite side of the rim and is provided with a companion confining flange similar to 2 and is adapted to be slipped upon the rim or off therefrom. The lock-ring is formed with an outer flange 4 to embrace and limit outward expansion of the split binder when the latter is in position.

The binder 5 is of annular formation and is split and is of a diameter to snugly encompass the side of the rim 1 upon which is fitted the lock-ring 3. The annular binder 5 is constructed of stout spring wire and one end is provided with a keeper 6 having an opening extended therein to receive the opposite end of the binder, the outer side of the keeper being slotted to admit of the free entrance and exit of the opposite end of the binder when placing the ends together or separating the same. The rim is provided near the side opposite that provided with the flange 2 with a groove or channel forming a seat 7 in which is fitted the annular binder 5 and which seat is supplied at intervals with openings or depressions 8 to receive lugs or projections 9 extended from the binder so as to limit and prevent outward displacement thereof. The lugs or projections 9 may be integral parts of the annular binder or may be clipped or otherwise attached thereto, as found most advantageous in manufacture. When the annular binder is in position, a portion thereof enters the seat 7 and a portion projects outward from the rim to engage with the lock-ring and prevent outward displacement thereof, the annular binder being prevented from spreading by the flange 4 of the lock-ring embracing the same.

When the lock-ring and annular binder are removed from the rim, the tire 10 may be placed in position upon the rim, after which the lock-ring is placed in position and is secured by the annular binder, the same being fitted to the rim and having its lugs or projections 9 extended into the openings or depressions 8. It is to be understood that the lock-ring must be pressed inward a sufficient distance to admit of placing the annular binder in the seat or annular channel 7, after which the lock-ring is permitted to spring outward to cause its flange 4 to encircle the annular binder and prevent spreading thereof.

In the modification shown in Fig. 4, the edge portion of the rim 1 opposite to the flange 2 is straight and is provided at intervals in its length with depressions or openings 8 to receive lugs or projections 9 of the annular binder 5, the latter being prevented from expanding by the outer flange 4 of the lock ring 3.

Having thus described the invention, what is claimed as new is:

1. In a vehicle wheel, the combination of a rim provided at one side with a confining flange, a lock-ring slipped upon the opposite side of the rim and having a corresponding confining flange, a split spring annular binder fitted to the rim and adapted to prevent outward displacement of the lock-ring, and a keeper at one end of the binder having an opening therein to receive the opposite end of the said binder and having a slot in its side to provide
5 ingress and egress to the said opposite end of the binder.

2. In a vehicle wheel, the combination of a rim provided at one side with a confining flange and having a seat at the opposite side and an opening extended from said seat, a lock-ring slipped upon the rim, a split spring
10 annular binder fitted to the said seat of the rim and having projections to enter the openings leading from the seat of said rim, and a keeper at one end of the annular binder having an opening to receive the opposite end of said binder and provided with a projection to enter an opening of the seat of the rim to prevent transverse displacement 15 of the adjacent ends of the binder when the parts are assembled.

In testimony whereof we affix our signatures in presence of two witnesses.

FRANK M. HILTON. [L. S.]
    JOHN S. HILTON. [L. S.]
    WILLIAM W. HILTON. [L. S.]

Witnesses:
 EDITH E. MERRELL,
 LOTTIE M. RUSSELL.